Jan. 19, 1937.   L. H. MESSINGER, JR   2,067,975
VEHICLE BRAKING MEANS
Filed March 17, 1934   2 Sheets-Sheet 1
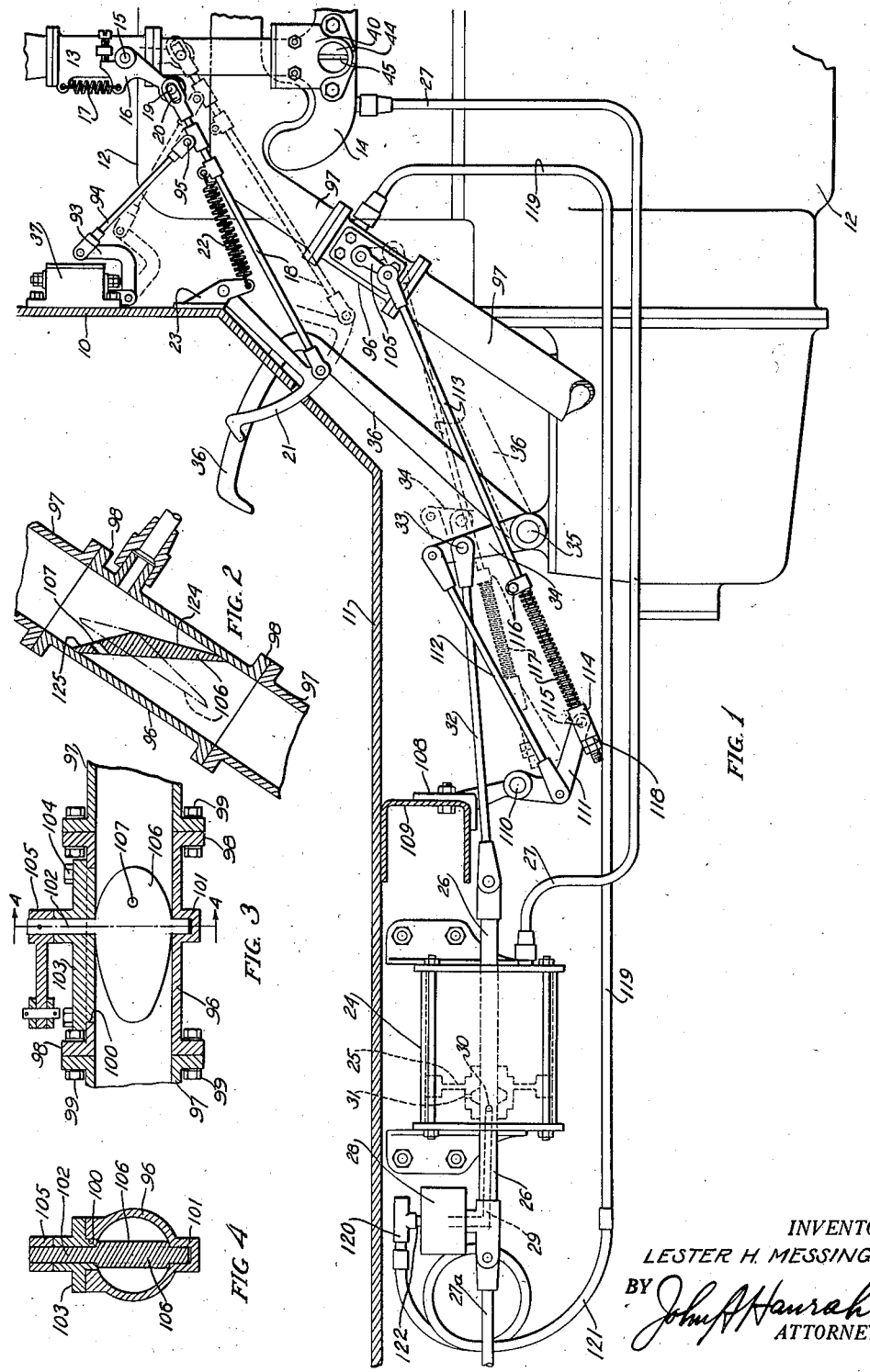
INVENTOR.
LESTER H. MESSINGER Jr.
BY John J Hanrahan
ATTORNEY

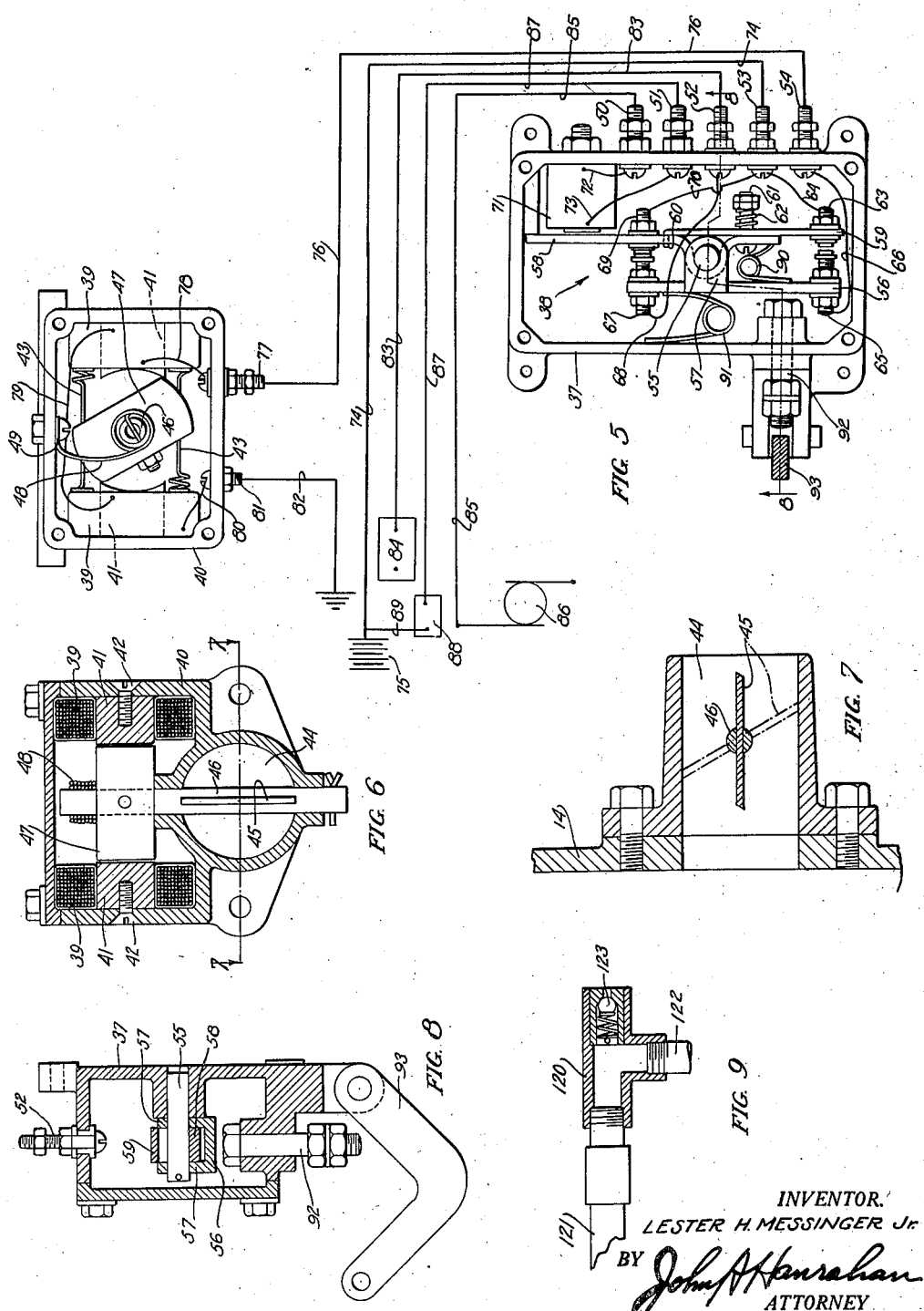
Jan. 19, 1937. L. H. MESSINGER, JR 2,067,975
VEHICLE BRAKING MEANS
Filed March 17, 1934    2 Sheets-Sheet 2
INVENTOR.
LESTER H. MESSINGER Jr.
BY *John A Hanrahan*
ATTORNEY Patented Jan. 19, 1937

2,067,975

UNITED STATES PATENT OFFICE 2,067,975

VEHICLE BRAKING MEANS

Lester H. Messinger, Jr., Trumbull, Conn., assignor to Messinger Devices, Incorporated, Bridgeport, Conn., a corporation of Connecticut Application March 17, 1934, Serial No. 716,090

32 Claims. (Cl. 192—3)

This invention relates to new and useful improvements in automotive vehicles and has relation to the braking of said vehicles.

The invention comprehends the providing of a vehicle with braking means to assist the usual vehicle braking means.

The invention also comprehends the providing of means to replace the braking effect which is lost when an automobile engine is equipped with a means including an air inlet valve such as shown in my application Serial Number 653,255 of January 24, 1933 and which means destroys the vacuum in an intake manifold at certain times so that vacuum is not maintained in a booster brake cylinder.

Other important objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a side elevational view illustrating an embodiment of the invention;

Fig. 2 is a vertical sectional view through a portion of an exhaust line showing a valve therein in closed position;

Fig. 3 is a horizontal sectional view through the portion of Fig. 2 but with the valve open;

Fig. 4 is a transverse sectional view taken substantially along the line 4—4 of Fig. 3;

Fig. 5 is a view showing the wiring of an air inlet valve;

Fig. 6 is a sectional view showing the solenoid for actuating said valve;

Fig. 7 is a sectional view taken substantially along the line 7—7 of Fig. 6;

Fig. 8 is a sectional view taken substantially along the line 8—8 of Fig. 5; and Fig. 9 is a sectional view of an air inlet to the atmospheric side of a booster brake cylinder.

Referring in detail to the drawings, in Fig. 1 is shown a portion of an automobile including a dash 10 and the usual floor 11 and in front of the dash there is shown a portion of a motor 12 to which the fuel is fed as from a carburetor 13 through an intake manifold 14. The supply of fuel is controlled in the usual manner by a throttle valve, the stem of which is shown at 15 connected with an operating arm 16 extending to each side of the stem and at one end connected with a spring 17, the tendency of which is to return the throttle valve to closed position when moved therefrom.

Connected with the other end of the arm 16 is a rod 18 the connection being formed as by a pin 19 on the arm and an elongated slot 20 in the end of the rod. At its rear end rod 18 is pivotally connected with an accelerator or throttle pedal 21 and a coil spring 22 is anchored at one end to the rod and at its other end to a stationary bracket 23 and serves to return the rod and accelerator pedal to their normal full line positions when moved therefrom as suggested by the broken lines in Fig. 1.

Beneath the floor 11 there is located the usual braking system including a booster brake cylinder 24 of the "vacuum suspended" type and within the cylinder there is arranged a piston 25 slidable in the cylinder and provided with valve seats (not shown) for co-operation with valves (not shown) on the rod 26 which extends through the cylinder and projects beyond each of its ends. The rear end of rod 26 is connected in any suitable manner as by the means 27a to actuate the usual brakes. The construction of cylinder 24 and associated parts is old and well known in the art and is fully disclosed in Patent 1,583,117 of May 4th, 1926.

A tube 27 places the cylinder 24 in communication with the intake manifold 14 so that a substantial degree of vacuum is maintained in the cylinder when the engine 12 is in operation. In the normal position of the parts the piston 25 is located in the rear portion of the cylinder 24 as shown and through an air strainer 28 air may be admitted through a passage 29 to a discharge port 30 which port is normally closed off from communication with the interior of the cylinder by means of the valves above referred to as mounted on the rod 26.

This is the usual construction and on the rod 26 being moved forwardly or toward the right in Fig. 1 one of the mentioned valves is unseated and air is permitted to enter the cylinder to the rear of the piston 25 through a passage 31 and such air being at atmospheric pressure forces the piston forwardly in the cylinder until the piston again seats against said valve when further entrance of air is prevented. In this way the piston follows the rod 26 and the movement of the latter depends of course on manual operation of the braking means so that it may be said that the piston follows the brakes. As above pointed out, this is a usual arrangement of a vacuum booster brake system.

The forward end of rod 26 has connected to it the rear end of a rod 32 the forward end of which is pivotally connected at 33 with an arm 34 secured to a rotatable shaft 35. Shaft 35 is rigid with a foot lever 36 and from Fig. 1 it will be apparent that on this brake lever 36 being depressed the rod 32 will be carried forwardly resulting in the rod 26 being shifted forwardly to bring about application of pressure to the piston 25 as above set forth.

The above mentioned air inlet valve provides means whereby at certain times air in large quantities is admitted to the intake manifold 14 and the air is admitted in such quantities that no vacuum exists in said manifold and consequently vacuum is not maintained in the cylinder 24 by suction through the tube 27. This valve means is fully disclosed in my application above mentioned and according to the disclosure of said application a housing 37 containing a switching mechanism generally designated 38 is bolted or otherwise secured to the dash 19.

This switching mechanism amongst its other functions controls a circuit to the coils 39 of a solenoid magnet mounted within a housing 40 and the cores of said coils are designated 41 and are secured in place by screws 42. The coils may be held in place about the cores by any desired means and in Fig. 5 coil springs 43 are shown serving this purpose. Housing 40 is shown in Fig. 1 as connected with the intake manifold 14 of the engine and in its lower portion the housing includes a port 44 through which air may be admitted directly to the manifold instead of through the carburetor. Arranged in the port 44 is a valve 45 the upper portion of the stem 46 of which extends into the space between the magnet coils 39.

To the upper portion of the stem 46 there is secured an armature 47 adapted to be attracted by the electro-magnets and when so attracted adapted to turn the valve 45 shifting it to open position whereby air will be admitted through port 44 to the manifold in advance of the carburetor. A spring 48 has one of its ends anchored to the housing at 49 and has its other end portion wrapped repeatedly around and anchored in the upper portion of the valve stem and the spring is made of great length to have it exert a constant pressure and the spring tends to retain the valve 45 in closed position and to return it to such position when moved therefrom.

Mounted on the housing 37 or otherwise suitably located are five binding posts 50, 51, 52, 53 and 54 respectively. These binding posts are insulated from the housing and from one another. Within the housing is a short shaft 55 on which is pivotally mounted a plate-like member 56 having up-turned ears 57 pivotally mounting the member on the shaft. Also, pivotally mounted on the same shaft is an armature 58 off-set intermediate its ends and having such off-set portion embracing the shaft between the ears 57. A member 59 has its end 60 passed downwardly through a slot in armature 58 and extends over the shaft 55 and beyond one end of the armature. A bolt 61 passes through member 59 and said end of the armature and a spring 62 normally tends to keep member 59 against the armature but permits these parts to be pressed apart in spaced relation to the down-turned end 60 of said member.

The member 59 carries a contact element 63 connected with the binding post 53 by a wire 64 and the plate-like member 56 carries a contact element 65 connected with the binding post 54 by a wire 66. Plate-like member 56 also carries a contact member 67 connected with binding post 52 by a wire 68 and the armature 58 carries a contact member 69 connected with binding post 53 by a wire 70. Within one end portion of the housing 37 there is arranged an electromagnet 71, the coil of which is connected with the binding posts 50 and 51 by wires 72 and 73.

A lead 74 connects the binding post 53 with the positive side of a battery 75 while a lead 76 connects binding post 54 with a binding post 77 on the housing 40 and which binding post 77 is connected with one of the coils 39 by a wire 78, the coils being connected together by wire 79 and the lead from the coils being shown at 80 and being connected with a binding post 81 from which a lead 82 extends to a ground. From binding post 52 a lead 83 extends to the ignition coil 84 of the automobile.

A lead 85 from the generator 86 is connected with the binding post 50 and a lead 87 from the binding post 51 is connected with a voltage regulator and cutout 88 and then to the battery by a lead 89 although it will be understood that the lead 87 may be connected with the battery and that a cutout may be inserted in the lead 85 in which event the voltage regulator and cutout 88 will be omitted. In some automobiles, particularly trucks and busses, the arrangement shown is used while in automobiles not equipped with a voltage regulator the cutout may be introduced in the lead 85 as above explained.

The member 56 and the armature 58 are mounted for movement together and relatively about the shaft 55. A spring 90 normally tends to move the members 56 and 58 apart and keep the contacts 63 and 65 separated. A spring 91 serves to prevent the members 56 and 58 pivoting freely about shaft 55 in a direction to bring the contact 63 into engagement with the upper wall of the housing and to prevent the contact 67 or the end of the armature coming into engagement with the lower wall of the housing.

A push rod 92 is slidable through the bottom wall of the housing 37 in alignment with, and with its inner end normally disposed in spaced relation to, the member 56. A bell-crank 93 is pivoted at the lower side of the housing 37 and to the free end of said bell-crank there is connected one end of a rod 94 and the other end of said rod is connected with rod 18 at 95.

With the arrangement described, when the throttle lever 21 is depressed the throttle valve is operated in the usual manner and the port 44 remains closed so that there is no change in the operation of the engine when the latter is operating under load. While the speed of the engine is sufficient to drive the generator at charging speed the magnet 71 is energized and attracts the armature so that the switch parts are held in the positions of Fig. 5 provided the engine is operating with advanced throttle.

In said Fig. 5 contacts 67 and 69 are in engagement and the circuit is closed between the battery and the ignition means of the engine and the contacts 63 and 65 are spaced so the circuit to the coils 39 is open. Now on retarding the throttle while the engine operates above a predetermined speed the bell-crank 93 engages and moves the push rod 92 inwardly to have it engage member 56 and rock it about the shaft 55 in opposition to the spring 90. As the magnet 71 is holding the armature, initial movement of member 56 will cause separation of contacts 67 and 69 to open the ignition circuit and thereafter contacts 63 and 65 are brought into engagement closing the circuit to coils 39 to have them attract the armature 47 and swing valve 45 to open position. This admits air to the manifold 14 so there will be no vacuum on the carburetor to draw fuel into the engine and port 44 being relatively large there is a free intake and exhaust of air by the engine.

On the engine dropping below the speed necessary to drive the generator at charging speed, magnet 71 will not be energized and will release the armature 58 permitting the same to move about shaft 55 in a direction to bring contact 69 into engagement with contact 67 to close the ignition circuit, and shift contact 63 away from contact 65 to open the circuit to the coils 39. When the ignition circuit is open valve 45 is open and with the parts so positioned should the throttle be advanced bell-crank 93 will be carried away from push rod 92 and the latter will move outwardly permitting the parts to return to their positions of Fig. 5. On advancing the throttle the engine is speeded up and the generator is operated at charging speed. With retarded throttle should the engine drop to idling speed or be operating slowly under load magnet 71 will not be energized and push rod 92 will cause the entire switch mechanism 38 to rock about shaft 55. When this occurs contacts 67 and 69 close the ignition circuit and contacts 63 and 65 are spaced opening the circuit to coils 39. Now valve 45 is closed and the engine idles as usual.

As above suggested when a vehicle engine is operating under forced momentum or with retarded throttle above a predetermined speed and is equipped with the air inlet valve mechanism just described the port 44 is open and air is freely admitted to the engine and suction is not created in the tube 27 so that vacuum is not maintained in the booster brake cylinder 24. This same effect will result from the use of other types of air inlet valves for internal combustion engines. To make up for or replace this lost braking effect I provide automatic means for creating a back pressure in the engine 12 so as to have the latter act as a brake and I further provide for utilizing this back pressure to apply pressure to the atmospheric air intake side of the booster brake system.

As disclosed a section 96 is connected in to form part of the exhaust line 97 of the engine 12 and this section 96 is shown as provided at its respective ends with flanges 98 secured by bolts 99 to corresponding flanges on the adjacent ends of the sections of the exhaust pipe. In one side, section 96 is provided with an elongated opening or slot 100 and opposite said slot the section is provided with a hollow boss 101 providing a bearing for a valve stem 102. Such valve stem passes through and is turnable in a block 103 which is secured in place, closing the slot 100, as by bolts 104. As shown stem 102 extends entirely through the block 103 and to the outer end of said stem there is secured a lever 105. Also valve stem 102 extends diametrically across the section 96 when the parts are assembled so that the inner end of the valve stem has bearing in the boss 101.

A valve 106 is formed with the valve stem and the arrangement is such that the valve 106 and valve stem, and block 103, and if desired lever 105, are assembled to form a unit and this unit is incorporated with the section 96 by passing the valve and stem through slot 100 and then bolting the block in place, the block including a tongue-like portion entering the said slot. Valve stem 102 extends centrally across the section 96 and the valve 106 moves with the stem and as here shown such valve is of generated outline so that when it occupies the full line position of Fig. 2 its edges are in contact with the inner periphery of the section 96. However, the valve has an opening 107 therethrough the purpose of which will later be set forth.

A bracket 108 is suitably secured to a part 109 of the vehicle frame and at 110 a lever 111 is pivoted on said bracket. Link 112 is pivotally connected at its respective ends with the free end of arm 34 and an intermediate portion of the lever 111. A relatively long rod 113 is connected at its forward end to the free end of the valve lever 105 and on the rear portion of such rod there is slidably mounted a member 114 to which the free end of lever 111 is pivotally connected as at 115. Disposed about rod 113 between member 114 and a clip 116, secured to said rod, is a relatively long coil spring 117 the normal tendency of which is to force member 114 rearwardly along said rod. A nut 118 is threaded on the rear portion of rod 113 so as to hold the member 114 in adjusted position along said rod.

With this construction when the brake pedal 36 is operated to apply the usual brakes they will be applied and the booster system will operate in the usual manner. In addition link 112 will be drawn forwardly and will rock the lever 111 forwardly and upwardly from the full line to the dotted line position of Fig. 1. This will result in rod 113 being shifted forwardly to rock the valve lever 105 and consequently the valve 106 to close the latter. Only a relatively slight movement is required to close the valve and further movement of the arm 34 to further apply the brakes will result only in movement of member 114 along the rod 113 in a direction to compress spring 117. It will be noted that the mechanical arrangement of the parts is such that lever 111 has but a limited forward movement and that most of its movement is upwardly.

From the foregoing it will be understood that as the brake lever is operated to apply the brakes in the usual manner the valve 106 will be moved to a position across the exhaust line to close the same but that normally this valve is in an inoperative position as is clearly shown by the dotted lines in Fig. 2. When the valve 106 is across the exhaust line the latter is blocked and a back pressure is created in the engine and in the exhaust line at the engine side of the valve and the engine being coupled with the wheels of the vehicle through any or the usual clutch, the engine will exert great braking effort. Ordinarily, the right foot is used for both the accelerator pedal 21 and brake pedal 36. Therefore, when the brake is applied the operator's foot is removed from the accelerator pedal and the throttle will be retarded due to the action of springs 17 and 22 and if the vehicle is driving the engine above a predetermined speed the port 44 will be open and no fuel will be drawn into the engine but the latter will be pumping air. Therefore, the back pressure above mentioned will be set up due to the compression of air and not to the compression of an explosive mixture.

When the vehicle is travelling at low speed no breaking effort other than that obtainable from the usual braking means is required to stop the vehicle and to prevent stalling of the engine it is usual to disengage the clutch when an automobile is being reduced to a very low speed or brought to a complete stop. With the present means the break and clutch are operated in the usual manner and the brake is maintained applied to bring the vehicle to a complete stop. This may be accomplished without stalling the engine since when the engine reaches idling speed valve 45 automatically closes port 44 to have the engine resume operation and the only fluid entering the engine is the mixture necessary to support idling of the engine and such mixture is taken into the engine and exhausted thereby in very small quantities. In fact the volume of exhaust gas discharged by the engine when idling is so slight as to be capable of passing through the hole or opening 107 in valve 106, when the latter is closed, without creating a substantial back pressure in the engine.

Therefore, it will be understood that the brake may be kept applied to bring the vehicle to a complete stop without danger of causing stalling of the engine due to back pressure therein. The small opening 107, which is but of a small fraction of an inch in diameter, is sufficient to permit of the escape of exhaust gases without creating a substantial back pressure in the engine when the valve is closed and the engine is idling. This prevents stalling of the engine when the brake is maintained applied to bring the automobile to a complete stop. However, when the engine is being driven with the port 44 open large quantities of air are passed through the engine and a very substantial back pressure is built up to give braking effort. This back pressure reaches its limit when it becomes sufficient to prevent closing of the usual engine exhaust valves.

To further increase the effectiveness of the automobile braking system a tube 119 is connected to communicate with the interior of section 96 at the engine side of the valve 106 and this tube is carried rearwardly of the vehicle and has its rear end connected with a T-fitting 120 by means of a flexible member 121 and the required connecting nipples. One arm of this fitting 120 through a nipple 122 communicates through the air strainer 28, with the passage 29. In the third arm of the fitting there is arranged a spring pressed ball 123, or other check valve, designed to open inwardly when the pressure at its inner side is less than the atmospheric pressure against its outer side.

With the described arrangement when the brake is applied and rod 26 of the booster cylinder is moved forwardly air at atmospheric pressure may enter fitting 120 by forcing valve 123 off its seat and such air passes through passage 29 and ports 30 and 31 to move the piston forwardly in the usual manner. As above explained, when port 44 is opened there is no suction in tube 27 and after the brake is applied once or twice there is no longer any appreciable degree of vacuum present in the cylinder 24. This loss of vacuum in the cylinder 24 is fully compensated for due to the fact that air under pressure is supplied to passage 29 by way of tube 119 hose 121 and fitting 120 and from passage 29 to the interior of the cylinder at the rear of piston 25.

That is air under pressure is supplied to the cylinder in place of, or in addition to, the air at atmospheric pressure normally used to operate against one side of piston 25 while a high degree of vacuum is maintained at the other side thereof through the tube 27. When this vacuum is not present for the reasons above stated or for any other reasons air under relatively high pressure is, due to the present means, available to operate against one side of the piston and against atmospheric pressure at the other side thereof.

From the foregoing it will be understood that when the brake is applied valve 123 is only open temporarily or until a back pressure is built up in the engine and through tube 119 and hose 121 to the fitting 120. Further, it will be understood that with the present means each time the brake is applied air under pressure is introduced into the cylinder 24 at the rear side of piston 25 and that such air under pressure may in some cases supplant a vacuum at the rear of the piston and shift the piston forwardly against a vacuum at the forward side of the piston or such air under pressure may supplant atmospheric pressure at the rear of the piston to move the same forwardly against atmospheric pressure at the forward side of the piston. This will depend on whether or not vacuum is present in the cylinder and it will be understood that with this type of booster apparatus vacuum is maintained at both sides of the piston 25 under the usual operating conditions.

Particularly by reference to Fig. 2 it will be noted that valve 106 on its engine side has its face portion 124 of greater area than its face portion 125. Therefore, it will be understood that when the valve is closed the pressure of air against the engine side of the valve will be constantly tending to open the valve. This arrangement is provided so that the valve will be automatically opened and not interfere with the normal operation of the engine should any valve operating part become broken or disconnected. Should this last occur the valve will not be held closed but will be forced open by the pressure of exhaust gas when the engine is operating above idling speed.

Attention is also directed to the fact that opening 107 in valve 106 is only for the purpose of permitting the escape of exhaust gases without creating a back pressure when the valve is closed and the engine is idling. This same result may be obtained with any desired shape of opening and may be obtained by allowing a predetermined clearance between the edges of the valve and the walls of the exhaust line section 96 when the valve is closed. It will now be understood that with the present means the booster braking system of a motor vehicle is augmented or made more effective by having fluid under pressure supplied to act against its piston and that the application of the vehicle brakes when the vehicle is travelling at high speed also results in a back pressure being created in the engine whereby it acts as a brake.

It is the forming of back pressure in the engine which makes fluid under pressure available for introduction into the booster brake system to act against the piston thereof. However, the invention is not limited to a booster brake system since certain features of the invention are applicable to a motor vehicle not equipped with such braking system. Further, it should be understood that the invention is not restricted to use with booster brake systems of the particular type shown since it may be used in any system to substitute fluid— usually air—under pressure for air at atmospheric pressure for actuating the piston of the system. Likewise, it should be clear that the check valve 123 is not absolutely necessary and may be omitted.

The air under pressure at the engine side of valve 106, when the latter is closed may be used for operating an ejector as shown in my application Serial Number 716,091 filed March 17th, 1934 and which is now United States Patent 2,044,316, issued June 16, 1936. Further, compressed air from this source may be carried to a storage tank to be used for the operation of any or the usual types of pressure brakes.

Having thus set forth the nature of my invention, what I claim is:

1. In a braking system for a motor vehicle, an internal combustion engine for propelling the vehicle, an exhaust passage for said engine, an intake passage for the engine, means for supplying fuel to the engine, throttle means controlling said fuel supply means and shiftable between advanced and retarded positions, a throttle lever controlling said throttle means, a lever for operating the friction brake mechanism of said vehicle, a valve in said exhaust passage and operable to and from a closed position, means connecting the valve and lever whereby the valve is closed as the lever is operated in a direction to apply the vehicle friction brakes, and means independent of the vehicle friction braking mechanism for admitting air to said intake passage substantially to the exclusion of fuel when said engine is operating above a predetermined speed with retarded throttle lever to have the engine pump air to the exclusion of fuel whereby on closing of the exhaust passage valve while the engine is operating above predetermined speed with retarded throttle lever air will be compressed by and form a back pressure in the engine.

2. In a braking system for a motor vehicle, an internal combustion engine for propelling the vehicle, an intake and an exhaust passage for said engine, means for supplying fuel to said intake passage, throttle means controlling said fuel supply means and shiftable between advanced and retarded positions, means for admitting air to said intake passage substantially to the exclusion of fuel when said engine is operating above predetermined speed with retarded throttle and to cut off said supply of air when the engine drops below said speed, a brake lever for operating the friction brake mechanism of said vehicle, a valve in said exhaust passage and operable to and from a closed position, means connecting the valve and brake lever whereby the valve is closed as the brake lever is operated in a direction to apply the vehicle friction brakes and is maintained closed until the brake lever is released, and said valve having an opening therethrough of such size as to permit of movement therethrough of the exhaust gases discharged by the engine at idling speed whereby to prevent stalling of the engine at idling speed when the vehicle friction brakes are applied.

3. In a braking system for a motor vehicle, an internal combustion engine for propelling said vehicle, an intake and an exhaust passage for said engine, a brake lever for operating the friction brake mechanism of said vehicle, a valve in said exhaust passage and operable to and from a closed position, mechanical means connecting the valve and brake lever whereby the valve is closed as the brake lever is operated in a direction to apply the vehicle friction brakes and is maintained closed until the brake lever is released, said connecting means including a lost motion device whereby said valve is closed on initial movement of the brake lever and further movement of the brake lever in applying the friction brakes does not change the position of the valve, and said valve when in closed position permitting of the movement through said exhaust passage of a limited volume of exhaust gases to prevent stalling of the engine at idling speed when the vehicle friction brakes are applied, and said valve when closed at normal vehicle running speeds serving to cause a back pressure to be built up in the engine to the full capacity of the engine exhaust valves.

4. In a braking system for a motor vehicle, an internal combustion engine for propelling said vehicle, an intake and an exhaust passage for said engine, a brake lever for operating the friction brake mechanism of said vehicle, a valve in said exhaust passage and operable to and from a closed position, mechanical means connecting the valve and brake lever whereby the valve is closed as the friction brake lever is operated in a direction to apply the vehicle brakes and is maintained closed until the brake lever is released, said connecting means including a lost motion device whereby said valve is closed on initial movement of the brake lever and further movement of the brake lever in applying the friction brakes does not change the position of the valve, and said valve having an opening therethrough of such size as to permit of movement therethrough of the exhaust gases discharged by the engine at idling speed whereby to prevent stalling of the engine at idling speed when the vehicle friction brakes are applied, and said valve when closed at normal vehicle running speeds serving to cause a back pressure to be built up in the engine to the full capacity of the engine exhaust valves.

5. In a braking system for a motor vehicle, an internal combustion engine for propelling said vehicle, an intake and an exhaust passage for said engine, a brake lever for operating the brake mechanism of said vehicle, a valve in said exhaust passage and operable to and from a closed position, means connecting the valve and brake lever whereby the valve is closed as the brake lever is operated in a direction to apply the vehicle brakes, said connecting means including an arm on said valve, a lever pivoted at one end, a link movable by said brake lever and connected at one end to an intermediate portion of said pivoted lever, a rod pivotally connected at one end with said arm, means pivotally connected with the free end of said pivoted lever and slidable along said rod, a coil spring about said rod and held at one end and at its other end bearing against said last means whereby as said means is shifted along the rod it compresses the spring and closes the valve, and said valve when in closed position permitting of the movement through said exhaust passage of a limited volume of exhaust gases without creation of a substantial back pressure whereby to prevent stalling of the engine at idling speed when the vehicle brakes are applied.

6. In a braking system for a motor vehicle, an internal combustion engine for propelling the vehicle, an intake and an exhaust passage for said engine, said vehicle including a vacuum booster brake system, a brake lever for operating the brake system, a valve in said exhaust passage and operable to and from a closed position, means connecting the valve and brake lever whereby the valve is closed to create a back pressure in the engine as the brake lever is operated in a direction to apply the vehicle brakes, and a connection from the engine side of said valve to the atmospheric air inlet side of said booster brake system whereby said back pressure may be applied to the booster brake system to operate the same on movement of said lever irrespective of the presence of vacuum in the system.

7. In a braking system for a motor vehicle, an internal combustion engine for propelling the vehicle and including a throttle lever, said vehicle including a booster brake system, means for creating a substantial back pressure in the engine on retarding of the engine throttle lever and application of the vehicle brakes while the engine is operating above a predetermined speed, and means for applying said back pressure against the atmospheric side of said booster brake system.

8. In a braking system for a motor vehicle, an internal combustion engine for propelling the vehicle and including a throttle lever, said vehicle including a booster brake system, means for creating a substantial back pressure in the engine on retarding of the engine throttle lever and application of the vehicle brakes only while the engine is operating above a predetermined speed, and means for applying said back pressure against the atmospheric side of said booster brake system.

9. In combination in a motor vehicle, a booster brake system including a piston, means for applying a vacuum to one side of said piston, and means for applying a fluid under pressure greater than atmospheric pressure to the other side of said piston to operate said brake system irrespective of the effectiveness of said vacuum applying means on operation of the vehicle brake lever in a direction to apply the brakes.

10. In combination with the braking system of a motor vehicle including an internal combustion engine for propelling the vehicle, means operable to create a substantial back pressure in said engine only when the engine is operating above a predetermined speed, and means utilizing said pressure to apply the vehicle brakes.

11. In a motor vehicle including an internal combustion engine for propelling the vehicle and including a throttle lever, said vehicle including a power braking system, means for creating a substantial back pressure in the engine on retarding of the engine throttle lever and operation of the vehicle brake lever only while the engine is operating above a predetermined speed, and means for applying said back pressure to the operation of the vehicle brakes.

12. In a braking system for a motor vehicle, an internal combustion engine for propelling the vehicle, an intake and an exhaust passage for said engine, said vehicle including a vacuum booster brake system, a brake lever for operating the brake system, a valve in said exhaust passage and operable to and from a closed position, means connecting the valve and brake lever whereby the valve is completely closed to create a back pressure in the engine on initial movement of the brake lever toward brake applying position and further movement of the brake lever in said direction does not change the position of the valve, and a connection from the engine side of said valve to the atmospheric air inlet side of said booster brake system whereby said back pressure may be applied to the booster brake system to operate the same on movement of the brake lever irrespective of the presence of vacuum in the system.

13. In a braking system for a motor vehicle, an internal combustion engine for propelling the vehicle, said vehicle including a vacuum booster brake system and a brake lever controlling the same, means for creating a back pressure in the engine on initial movement of the brake lever, and means for applying said back pressure against the atmospheric side of said booster brake system to operate the same to apply the vehicle brakes irrespective of the presence of vacuum in the system.

14. In combination in a motor vehicle, a booster brake system including a cylinder and a piston in said cylinder, means for maintaining a vacuum in said cylinder whereby the vehicle brakes may be applied by admitting air at atmospheric pressure to the cylinder at one side of said piston, and manually controlled means for applying a pressure greater than atmospheric pressure to said side of said piston to cause the latter to move to apply the vehicle brakes irrespective of the presence of vacuum in said cylinder.

15. In combination in a motor vehicle, a booster brake system including a brake lever, a cylinder and a piston in said cylinder, means for maintaining a vacuum in said cylinder whereby the vehicle brakes may be applied by admitting air at atmospheric pressure to the cylinder at one side of said piston, and means controlled by said brake lever for applying a pressure greater than atmospheric pressure to said side of said piston as the brake lever is moved to apply the vehicle brakes irrespective of the presence of vacuum in said cylinder.

16. In combination in a vehicle including friction brakes for stopping the vehicle and an internal combustion engine for propelling the vehicle, means for creating a substantial black pressure in said engine, and optionally operable means for using variable quantities of the pressure so built up to apply the friction brakes of the vehicle.

17. In combination in a vehicle including friction brakes for stopping the vehicle and an internal combustion engine for propelling the vehicle, a lever for applying said brakes, means for creating a back pressure in said engine on initial movement of said lever toward brake applying position, and means for using the pressure so built up to progressively apply the friction brakes on progressive movement of said lever.

18. The combination with the braking system of a motor vehicle including an internal combustion engine for propelling the vehicle, said engine including a throttle lever, means operable to create a substantial back pressure in said engine only when the engine is operating above a predetermined speed with the engine throttle lever retarded, means utilizing said pressure to apply the vehicle brakes, and means controlling the application of said pressure to said last means.

19. In combination with the braking system of a motor vehicle including an internal combustion engine for propelling the vehicle, means for creating a back pressure in said engine at predetermined times, means utilizing said pressure to apply the vehicle brakes, and means separate from said first means and controlling the application of said pressure to said last means.

20. In combination in a vehicle including friction brakes for stopping the vehicle and an internal combustion engine for propelling the vehicle, means for creating a back pressure in said engine by confining gases pumped by the engine, and means for using variable amounts of said back pressure gases for variable intensity of application of said friction brakes.

21. In combination in a vehicle including friction brakes for stopping the vehicle and an internal combustion engine for propelling the vehicle, said engine including a throttle lever, means operable to create a substantial back pressure in said engine only when the same is above idling speed with the engine throttle lever retarded, and means for using variable amounts of said back pressure for variable intensity of application of said friction brakes.

22. In combination in a vehicle including friction brakes for stopping the vehicle and an internal combustion engine for propelling the vehicle, a lever for applying said brakes, a valve in the exhaust line of said engine, means to move said valve to its fullest closed position on initial movement of said lever toward brake applying position to create a substantial back pressure in the engine, and means for thereafter using the pressure so built up to progressively apply the friction brakes on progressive movement of said lever toward brake applying position.

23. In combination in a vehicle including friction brakes for stopping the vehicle and an internal combustion engine for propelling the vehicle, a lever for applying said brakes, a valve in the exhaust line of said engine, means to move said valve to its fullest closed position on initial movement of said lever toward brake applying position to create a substantial back pressure in the engine, and means for thereafter using variable quantities of the pressure so built up to apply the friction brakes on further movement of said lever toward brake applying position.

24. In combination in a vehicle including friction brakes for stopping the vehicle and an internal combustion engine for propelling the vehicle, a valve in the exhaust line of said engine, means to move said valve to its fullest closed position to create a back pressure in said engine, and optionally operable means for thereafter using variable quantities of the pressure gases so built up to apply the friction brakes.

25. In a braking system for a motor vehicle, an internal combustion engine for propelling the vehicle, an exhaust passage for said engine, means for supplying fuel to the engine, throttle means controlling said fuel supply means and shiftable between advanced and retarded positions, a brake lever for operating the friction brake mechanism of said vehicle, a valve in said exhaust passage and operable to and from a closed position, means connecting the valve and brake lever whereby the valve is closed as the brake lever is operated in a direction to apply the vehicle friction brakes, means for opening the ignition circuit of the engine and for admitting air to the engine substantially to the exclusion of fuel when said engine is operating above a predetermined speed with retarded throttle to have the engine pump air to the exclusion of fuel whereby on closing of the exhaust passage valve while the engine is operating above predetermined speed with retarded throttle air will be compressed by and form a back pressure in the engine, and said means operable to cut off said supply of air and close said ignition circuit when the engine drops below said predetermined speed.

26. In a braking system for a motor vehicle, an internal combustion engine for propelling the vehicle, an exhaust passage for said engine, means for supplying fuel to the engine, throttle means controlling said fuel supply means and shiftable between advanced and retarded positions, said vehicle including a booster brake system, a brake lever for operating the vehicle friction brakes, a valve in said exhaust passage and operable to and from a closed position, means connecting the valve and brake lever whereby the valve is closed as the brake lever is operated in a direction to apply the vehicle friction brakes, means for admitting air to the engine substantially to the exclusion of fuel when said engine is operating above predetermined speed with retarded throttle to have the engine pump air to the exclusion of fuel whereby on closing of the exhaust passage valve while the engine is operating above predetermined speed with retarded throttle air will be compressed by and form a back pressure in the engine, and a connection from the engine side of said valve to the atmospheric air inlet side of said booster brake system.

27. In a braking system for a motor vehicle, an internal combustion engine for propelling the vehicle, an exhaust passage for said engine, an intake passage for the engine, means for supplying fuel to the engine, a throttle lever controlling the fuel supply means and shiftable between advanced and retarded positions, said vehicle including a booster brake system, a brake lever for operating the booster brake system, a valve in said exhaust passage and operable to and from a closed position, means connecting the valve and brake lever whereby the valve is closed as the brake lever is operated in a direction to apply the booster brake system, a check valve for admitting air to said booster brake system on operation of said brake lever, means for admitting air to said intake passage substantially to the exclusion of fuel when said engine is operating above predetermined speed with retarded throttle lever to have the engine pump air to the exclusion of fuel whereby on closing of the exhaust passage valve while the engine is operating above predetermined speed with retarded throttle lever air will be compressed by and form a back pressure in the engine, and a connection from the engine side of said valve to the atmospheric air inlet side of said booster brake system.

28. In a braking system for a motor vehicle, an internal combustion engine for propelling the vehicle, means for supplying fuel to the engine, a throttle lever controlling said fuel supply means and shiftable between advanced and retarded positions, means for admitting air to the engine substantially to the exclusion of fuel when the engine is operating above predetermined speed with said throttle lever retarded, a brake lever for operating the friction brake mechanism of the vehicle, means for creating a back pressure in the engine when the brake lever is operated in a direction to apply said friction brake mechanism while said means is admitting air to the engine whereby said back pressure is created by compressing substantially fuel free air in the engine, and means utilizing said back pressure to apply the vehicle friction brakes.

29. In a braking system for a motor vehicle, an internal combustion engine for propelling the vehicle, an exhaust passage for said engine, an intake passage for the engine, means for supplying fuel to the engine, a throttle lever controlling said fuel supply means and shiftable between advanced and retarded positions, a brake lever for operating the friction brake mechanism of the vehicle, a valve in said exhaust passage, means mechanically connecting the valve and brake lever whereby the valve is moved to a position closing said exhaust passage as the brake lever is operated in a direction to apply the vehicle friction brakes, and means for admitting air to said intake passage substantially to the exclusion of fuel when said engine is operating above predetermined speed with retarded throttle lever to have the engine pump air to the exclusion of fuel whereby on closing of the exhaust passage by said valve while the engine is operating above predetermined speed with retarded throttle lever air will be compressed by and form a back pressure in the engine.

30. In a braking system for a motor vehicle, an internal combustion engine for propelling the vehicle, an exhaust passage for said engine, means for supplying fuel to the engine, a throttle lever controlling said fuel supply means and shiftable between advanced and retarded positions, a brake lever for operating the friction brake mechanism of said vehicle, a valve in said exhaust passage and operable to and from a closed position, means mechanically connecting the valve and brake lever whereby the valve is closed as the brake lever is operated in a direction to apply the vehicle friction brake, means for admitting air to the engine substantially to the exclusion of fuel when the engine is operating above predetermined speed with retarded throttle lever to have the engine pump air to the exclusion of fuel whereby on closing of the exhaust passage by said valve while the engine is operating above predetermined speed with retarded throttle lever air will be compressed by and form a back pressure in the engine, said means operable to cut off the supply of air and have the engine resume firing when the engine drops below said speed, and said valve having an opening therethrough to permit of movement through the exhaust passage of the gases discharged by the engine at idling speed whereby to prevent stalling of the engine at idling speed when said valve is closed.

31. In a braking system for a motor vehicle, an internal combustion engine for propelling the vehicle, an exhaust passage for said engine, means for supplying fuel to the engine, a throttle lever controlling said fuel supply means and shiftable between advanced and retarded positions, a brake lever for operating the friction brake mechanism of said vehicle, a valve in said exhaust passage and operable to and from a closed position, means connecting the valve and brake lever whereby the valve is closed as the brake lever is operated in a direction to apply the vehicle friction brakes, means independent of the vehicle friction braking mechanism for admitting air to the engine substantially to the exclusion of fuel when the engine is operating above predetermined speed with retarded throttle lever to have the engine pump air to the exclusion of fuel whereby on closing of the exhaust passage valve while the engine is operating above predetermined speed with retarded throttle lever air will be compressed by and form a back pressure in the engine, said means operable to cut off the supply of air to and have the engine resume firing when the engine drops below said speed, and said valve having an opening therethrough of such size as to permit of movement therethrough of the exhaust gases discharged by the engine at idling speed whereby to prevent stalling of the engine at idling speed when the vehicle friction brakes are applied and said valve is closed.

32. In a braking system for a motor vehicle, an internal combustion engine for propelling said vehicle, an intake and an exhaust passage for said engine, means for supplying fuel for said intake passage, throttle means controlling the fuel supply means and shiftable between advanced and retarded positions, a throttle lever controlling said throttle means, means for admitting air to the engine when the latter is operating above a predetermined speed with retarded throttle lever and to stop said supply of air when the engine drops below said speed, a brake lever controlling the friction brake mechanism of the vehicle, a valve in the exhaust passage and operable to and from a closed position, means connecting the valve and brake lever whereby the valve is closed as the brake lever is operated in a direction to apply the vehicle friction brakes and is maintained closed until the brake lever is released, and said valve when in closed position permitting of the movement through the exhaust passage of a limited volume of gases to prevent stalling of the engine at idling speed when said valve is closed.

LESTER H. MESSINGER, JR.